United States Patent
Taniguchi et al.

(10) Patent No.: US 7,568,164 B2
(45) Date of Patent: *Jul. 28, 2009

(54) SERVICE PROVIDING SYSTEM AND SERVICE PROVIDING DEVICE THAT PROVIDES A SPECIFIC SERVICE IN RESPONSE TO USER AUTHORITY DETERMINATION BASED ON POSITIONAL RELATIONSHIPS OF VIRTUAL OBJECTS

(75) Inventors: Shinya Taniguchi, Suwa (JP); Yoshiki Fukui, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 11/634,222

(22) Filed: Dec. 6, 2006

(65) Prior Publication Data

US 2007/0089056 A1    Apr. 19, 2007

Related U.S. Application Data

(62) Division of application No. 10/245,381, filed on Sep. 18, 2002, now Pat. No. 7,159,179.

(51) Int. Cl.
    *G06F 3/00*    (2006.01)
(52) U.S. Cl. ................ 715/771; 715/730; 715/741; 715/743; 715/744
(58) Field of Classification Search .......... 715/730, 715/743, 744, 771
    See application file for complete search history.

(56) References Cited

U.S. PATENT DOCUMENTS

| | | | | |
|---|---|---|---|---|
| 5,136,644 A | * | 8/1992 | Audebert et al. | 380/251 |
| 5,309,556 A | * | 5/1994 | Sismilich | 715/771 |
| 5,361,336 A | * | 11/1994 | Atchison | 715/740 |
| 5,640,002 A | * | 6/1997 | Ruppert et al. | 235/462.46 |
| 6,112,085 A | * | 8/2000 | Garner et al. | 455/428 |
| 6,144,848 A | * | 11/2000 | Walsh et al. | 455/419 |
| 6,283,598 B1 | * | 9/2001 | Inami et al. | 353/31 |
| 6,287,200 B1 | * | 9/2001 | Sharma | 463/40 |
| 6,396,517 B1 | * | 5/2002 | Beck et al. | 715/771 |
| 6,466,235 B1 | * | 10/2002 | Smith et al. | 715/771 |
| 6,587,739 B1 | * | 7/2003 | Abrams et al. | 700/83 |

(Continued)

*Primary Examiner*—William L Bashore
*Assistant Examiner*—Meseker Takele
(74) *Attorney, Agent, or Firm*—Oliff & Berridge, PLC (57) ABSTRACT

The invention provides a service providing system in which it is determined whether users have use authority to utilize a service providing apparatus, such as a projector, so that only users having the use authority can utilize the service providing apparatus. The invention also provides a service providing system and a service providing apparatus. In accordance with the invention, users are allowed to have use authority to utilize the service providing apparatus through entrance into an arbitrary place, or the like so that the service providing apparatus can be conveniently utilized. A service providing system includes an instruction apparatus to give operation instructions to a projector, a virtual object management apparatus to control operations related to virtual objects, such as the setting of the virtual objects, a use authority management unit to manage determination of the presence of use authority which a system user needs in order to utilize a service, the projector to display an image on a display unit in response to the contents of the instructions issued from the system user, and a network to perform data communication among the respective apparatuses.

2 Claims, 8 Drawing Sheets

U.S. PATENT DOCUMENTS 6,763,468 B2 * 7/2004 Gupta et al. .................. 726/2
6,850,252 B1 * 2/2005 Hoffberg .................... 715/716
6,915,957 B2 * 7/2005 Kisliakov .................... 235/492
2001/0040586 A1 * 11/2001 Yokoyama et al. .......... 345/672

* cited by examiner

SERVICE PROVIDING SYSTEM AND SERVICE PROVIDING DEVICE THAT PROVIDES A SPECIFIC SERVICE IN RESPONSE TO USER AUTHORITY DETERMINATION BASED ON POSITIONAL RELATIONSHIPS OF VIRTUAL OBJECTS

This is a Division of application Ser. No. 10/245,381 filed Sep. 18, 2002. The disclosure of the prior application is incorporated by reference herein in its entirety.

BACKGROUND OF THE INVENTION

1. Field of Invention

The present invention relates to a service providing system capable of providing a specific service from an output apparatus, such as a projector, by using the output apparatus and an instruction apparatus, such as a portable terminal, to give instructions to the output apparatus, in response to instructions which a user gives using the instruction apparatus. More particularly, the invention relates to a service providing system to qualify users capable of using the output apparatus.

2. Description of Related Art

In the related art, a projection-type display apparatus, such as a projector to display an image designated by a user on a screen, is utilized for presentations of new projects or new products in enterprises and the like, or presentation of papers in universities, learned societies and the like. The projector is operated by a controller, such as a personal computer (PC) or an exclusive remote controller. Further, the projector projects a picture on a monitor of the PC on the screen as it is, or displays image data from a terminal of a network. Furthermore, the user gives instructions to the projector by using the controller so as to perform manipulation, such as timely shifting of images to be displayed in accordance with the progress of a presentation.

SUMMARY OF THE INVENTION

However, according to the related art method, since everyone can operate a projector and cause any type of data to be displayed by manipulating a controller, such as a PC, there may be cases where data having improper contents are projected on a screen.

Moreover, on the contrary, when an audience member intends to ask a question about a presentation in a large conference room, the audience member must verbally give instructions to a presenter so as to cause the presenter to indicate the question point at issue, and thus it is impossible for the audience member to operate the projector at the audience member's location.

Therefore, the present invention addresses or solves the above and/or other problems in the related art. The present invention provides a service providing system in which it is determined whether users have use authority to utilize a service providing apparatus, such as a projector, so that only users having the use authority can utilize the service providing apparatus. The invention also provides a service providing system and a service providing apparatus. In accordance with the invention, users are allowed the authority to utilize the service providing apparatus through entrance into an arbitrary place, or the like so that the service providing apparatus can be conveniently utilized.

According to a first aspect of the present invention, there is provided a service providing system to provide a specific service in response to the contents of instructions issued from a system user having use authority, including a service providing apparatus to provide the specific service, an instruction apparatus to give the instructions to the service providing apparatus, and a use authority determination device to determine whether the system user has the use authority. The specific service is provided in response to the instructions from the instruction apparatus manipulated by the system user who has been determined as having the use authority.

With such a configuration, the use authority determination device can determine whether the system user has the use authority to utilize the service providing apparatus. If the user has the use authority, the service providing apparatus can provide the specific service in response to the instructions issued from the instruction apparatus manipulated by the system user.

That is, since a person having no use authority cannot be allowed to utilize the service, only a reliable person is allowed to have the use authority. Thus, it is possible to restrict use of the service by unqualified persons, thereby helping to reduce or prevent the occurrence of trouble.

Moreover, according to a second aspect of the present invention, the service providing system of the first aspect further includes a use authority information input unit to input use authority information on the use authority the system user has, and the use authority determination device is configured to determine whether the system user has the use authority based on the inputted use authority information.

That is, the use authority information is caused to be inputted by device of the use authority information input unit so that the use authority determination device determines whether the user has the use authority based on the inputted use authority information. Therefore, for example, an exclusive ID and password as the use authority are assigned to the user and the user inputs the assigned ID and password through a use authority information input unit, such as a keyboard, so that determination is made by the use authority determination device. If it is determined that the user has the use authority, the user can utilize the service.

Thus, since a person who has been determined as having no use authority cannot be allowed to utilize the service, only a reliable person is allowed to have the use authority. This can assist in reducing or preventing the occurrence of trouble.

Furthermore, according to a third aspect of the present invention, the service providing system of the first aspect further includes a use authority information reading device to read the use authority information from an authentication card on which the use authority information is recorded, and the use authority determination device is configured to determine whether the system user has the use authority based on the use authority information that is read.

That is, the use authority information is read by the use authority reading device from the authentication card on which the use authority information is recorded, and the use authority determination device determines whether the user has the use authority based on the read use authority information. If it is determined that the user has the use authority, the user can utilize the service.

Thus, with use of the authentication card, input of characters, and the like are not needed upon determination of presence of the use authority. Accordingly, the determination process is simplified. Furthermore, since a person who has been determined as having no use authority cannot be allowed to utilize the service, only a reliable person is allowed to have the use authority. This can assist in reducing or preventing the occurrence of trouble.

According to a fourth aspect of the present invention, there is provided a service providing system to provide a specific service in response to the contents of instructions issued from a system user having use authority, including:

a service providing apparatus to provide the specific service, an instruction apparatus to give the instructions to the service providing apparatus, a use authority determination device to determine whether the system user has the use authority, and a virtual object management terminal to manage a virtual object.

The virtual object management terminal includes:

a virtual object setting device which causes the service providing apparatus to be matched with a first virtual object and the instruction apparatus to be matched with a second virtual object and places the first virtual object in a virtual space matched with an actual space and the second virtual object at or around the position of the instruction apparatus in the virtual space, a position information acquisition device to acquire position information to specify a position of the instruction apparatus, and a positional relationship calculation device to calculate the positional relationship between the first and second virtual objects based on the acquired position information.

The use authority determination device is configured to determine that the system user has the use authority if the calculated positional relationship is a relationship in which the first and second virtual objects exist in an identical position in an overlapped state.

With such a configuration, when the instruction apparatus matched with the second virtual object moves toward and approaches the first virtual object which has been caused to be matched with the service providing apparatus by the virtual object setting device, the position information on the instruction apparatus is always acquired by the position information acquisition device and the positional relationship between the first and second virtual objects is calculated by the positional relationship calculation device based on the position information. Since the virtual objects have predetermined coverage, if there is a positional relationship in which the coverage of the virtual objects overlaps with each other from the calculated result, the use authority determination device is caused to determine that the user has the use authority.

With such a configuration, if the service providing apparatus is, for example, a projector, the projector is matched with a virtual object. For example, if a personal digital assistant (PDA) having a communications function can be used as an instruction apparatus for the projector, the PDA is also matched with another virtual object.

When a presenter or the like intends to utilize the projector, the presenter approaches the virtual object matched with the projector while carrying the PDA matched with the virtual object. Then, since the virtual object management terminal always acquires position information on the PDA, the positional relationship between the virtual objects is calculated based on the position information. In case of a positional relationship in which the virtual objects overlap with each other, it is determined that the presenter has the use authority. The user who has been determined as having the use authority can issue instructions to the projector by using the PDA as the instruction apparatus.

Further, in such a case, the PDA is configured to have a position information acquisition function, such as a function of a global positioning system (GPS) to acquire its own position information and to transmit the acquired position information to the virtual object management terminal through wireless communication.

Therefore, the instruction apparatus is not limited to a PDA. A mobile phone, a notebook PC or the like may be used as the instruction apparatus by causing it to be matched with the virtual object. Then, the projector can be utilized in such a manner that a person who intends to utilize a projector for which the person has use authority simply carries the equipment and causes it to approach the virtual object matched with the projector.

Therefore, since the virtual object matched with the projector is disposed at an arbitrary place, the user can conveniently utilize the service by simply entering the place while carrying the instruction apparatus matched with the virtual object. Further, since a person having no use authority cannot be allowed to utilize the service, only a reliable person is allowed to have the use authority (the instruction apparatus is caused to be matched with the virtual object, and so on). This can assist in reducing or preventing the occurrence of trouble.

The virtual object has a logical shape and arrangement position in the virtual space matched with the actual space. Its shape includes, for example, a sphere with a radius of about 1.0 m around the arrangement position, a cube of which each side has a length of about 1.0 m around the arrangement position, and all shapes which imitate natural objects, creatures and the like. Moreover, it is not limited to three-dimensional shapes, and instead may also have two-dimensional shapes, for example.

Furthermore, according to a fifth aspect of the present invention, in the service providing system of the fourth aspect, the service providing apparatus is caused to be matched with a plurality of first virtual objects and the plurality of first virtual objects are placed in the virtual space matched with the actual space, and the use authority determination device is configured to determine that the system user has the use authority if there is a relationship in which the second virtual object and any one of the first virtual objects exist in an identical position in an overlapped state.

Namely, the plurality of first virtual objects are matched with the service providing apparatus, and then placed in the virtual space matched with the actual space. If any one of the plurality of first virtual objects, and the first virtual object matched with the instruction apparatus exist in the identical position in the overlapped state, the use authority determination device determines that the user has the use authority. Accordingly, the user can utilize the service.

Therefore, if the service providing apparatus is, for example, a projector, the plurality of virtual objects are caused to be matched with the projector and then placed around the projector and a place, e.g., a questioning place, provided on the side of an auditorium. Further, for example, a PDA having the communications function is also matched with a virtual object so that the PDA can be used as the instruction apparatus for the projector.

When a presenter or the like intends to utilize the projector, the presenter approaches the virtual objects matched with the projector while carrying the PDA matched with the virtual object. Then, since the virtual object management terminal always acquires position information on the PDA, a positional relationship between the virtual objects is calculated based on the acquired position information. In case of a positional relationship in which the virtual objects overlap with each other, it is determined that the presenter has the use authority. Thus, the presenter can utilize the projector.

Meanwhile, when an audience member intends to ask the presenter a question by using the projector, the questioner simply enters the coverage of the virtual object arranged at the questioning place so that the positional relationship can be calculated from the position information as described above.

If the virtual objects overlap with each other, it is determined that the questioner has the use authority, and thus the questioner can utilize the service.

Accordingly, since the user can utilize the service by simply entering a specific place, the service can be easily and conveniently used. Further, since a person having no use authority cannot be allowed to utilize the service, only a reliable person is allowed to have the use authority. This can assist in reducing or preventing the occurrence of trouble. Moreover, the arrangement positions of the first virtual objects can be studied so that it is possible to allow the user to easily utilize the service, thereby enhancing convenience of use.

Furthermore, according to a sixth aspect of the present invention, the service providing system of the fourth aspect further includes an overlap history storage device to store a history such that when the service providing apparatus was caused to be matched with a plurality of first virtual objects, the second virtual object and any one of the first virtual objects existed in an identical position in an overlapped state; and the use authority determination device is configured to determine whether the system user has the use authority based on the contents stored in the overlap history storage device.

Namely, the plurality of first virtual objects are matched with the service providing apparatus, and then placed in the virtual space matched with the actual space. The overlap history storage device stores the history that the second virtual object matched with the instruction apparatus overlaps with the plurality of first virtual objects at the identical position. Further, the use authority determination device is configured to determine whether the user has the use authority based on the stored history. For example, if the service providing apparatus is the projector and a presentation is performed with such a system, the first virtual objects are placed around the projector and a rostrum on which the presenter performs the presentation. When the user moves while carrying the instruction apparatus, the second virtual object first comes into contact with the first virtual objects placed around the projector and subsequently with the first virtual objects placed around the rostrum. Such contact histories are stored in the overlap history storage device, and the use authority determination device determines whether the user has the use authority, from the overlapped sequence based on the stored histories. If the user has the use authority, the user is allowed to utilize the service. Such a configuration assists in preventing use of the service by an unqualified person, such as an outsider or audience member.

Moreover, according to a seventh aspect the present invention, in the service providing system of any one of the first to sixth aspects, the specific service is to cause an image to be displayed on a display unit in response to the contents of instructions issued from the system user, and the service providing apparatus is a projection-type display apparatus to display the image on the display unit.

Namely, the service providing apparatus is the projection-type display apparatus, and the specific service is to give instructions to the projection-type display apparatus through the instruction apparatus and to cause the image to be displayed on the display unit, such as a screen, by operating the projection-type display apparatus in response to the contents of the instructions from the instruction apparatus.

Moreover, according to an eighth aspect of the present invention, in the service providing system of the fourth to seventh aspects, virtual object setting device causes a predetermined device other than the service providing apparatus to a third virtual object, and the use authority determination device is configured to determine that the system user has the use authority if there is a relationship in which the second and third virtual objects and the first virtual object exist in an identical position in an overlapped state.

That is, the third virtual object is caused to be matched with the predetermined device other than the service providing apparatus by the virtual object setting device, and the use authority determination device is configured to determine that the user has the use authority when all of the second and third virtual objects and the first virtual object overlap with one another. For example, if the service providing apparatus is a projector and a presentation is performed using such a system, a microphone used for the presentation, for example, is caused to be matched with the third virtual object, and it is determined that the user has the use authority when the second virtual object matched with the instruction apparatus, the third virtual object matched with the microphone and the first virtual object matched with the projector overlap with one another. For instance, if the presenter carries a PDA as the instruction apparatus, data stored in the PDA can be projected by the projector. That is, since the presenter usually carries the microphone when performing a presentation, only a person who carries both the microphone and the instruction apparatus can have the use authority to utilize the service as the presenter. It can be expected to further enhance convenience of the service by studying or revising the setting of the third virtual object in this way.

Further, the predetermined device is not limited only to a microphone, and instead may be any device related to use of the service, including a laser pointer and a card, for example.

Moreover, according to a ninth aspect of the present invention, in the service providing system of the seventh or eighth aspects, the use authority determination means is configured to determine whether the system user has the use authority based on attribute information on data to be projected by the projection-type display apparatus.

Namely, the use authority determination device is configured to determine whether the user has the use authority to cause the data to be projected by the projection-type display apparatus based on the attribute information on the data projected by the projection-type display apparatus.

For instance, an author's name of data, a sender of data, memory addresses of data, authentication information on data, a size of data, the number of displayed pieces of data, a file format of data, and the like are set as the attribute information on the data. Since the presence of the use authority required to project the data is determined according to the setting conditions and the like, this can assist in reducing or preventing the projection of improper data.

Moreover, according to a tenth aspect of the present invention, there is provided a service providing apparatus to provide a specific service in a service providing system that provides the specific service in response to the contents of instructions issued from a system user having use authority. The service providing apparatus includes:

a use authority information input unit to input use authority information regarding the use authority of the system user, and a use authority determination unit to determine whether the system user has the use authority based on the inputted use authority information.

This corresponds to a case where the use authority information input unit to input the use authority information, and the use authority determination unit to determine whether the system user has the use authority are added to the service providing apparatus of the third aspect.

Furthermore, according to an eleventh aspect of the present invention, there is provided a service providing apparatus to provide a specific service in a service providing system that provides the specific service in response to the contents of instructions issued from a system user having use authority. The service providing apparatus includes:

a use authority information reading unit to read the use authority information from an authentication card on which the use authority information is recorded, and a use authority determination device to determine whether the system user has the use authority based on the read use authority information.

This corresponds to a case where the use authority information reading unit to read the use authority information from the authentication card, and the use authority determination device to determine whether the system user has the use authority are added to the service providing apparatus of the fourth aspect.

BRIEF DESCRIPTION OF THE DRAWINGS

FIG. 3 is a flowchart illustrating a process of determining use authority based on area-in;

DETAILED DESCRIPTION OF PREFERRED EMBODIMENTS

Hereinafter, exemplary embodiments of the present invention are explained with reference to the accompanying drawings. FIGS. 1-11 show exemplary embodiments of a service providing system according to the present invention.

Figure 1:
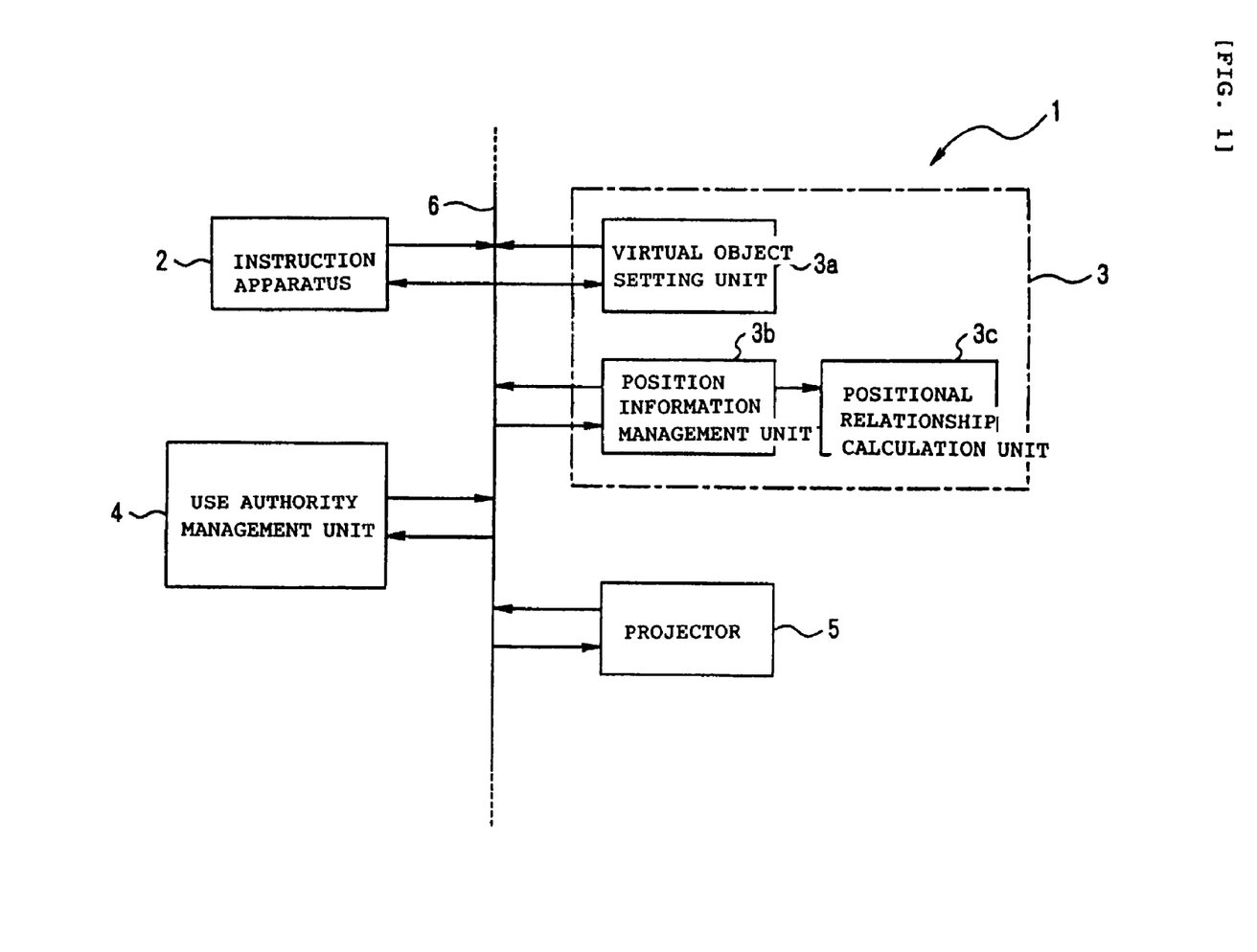
FIG. 1 is a schematic showing a service providing system according to the present invention.
Figure 2:
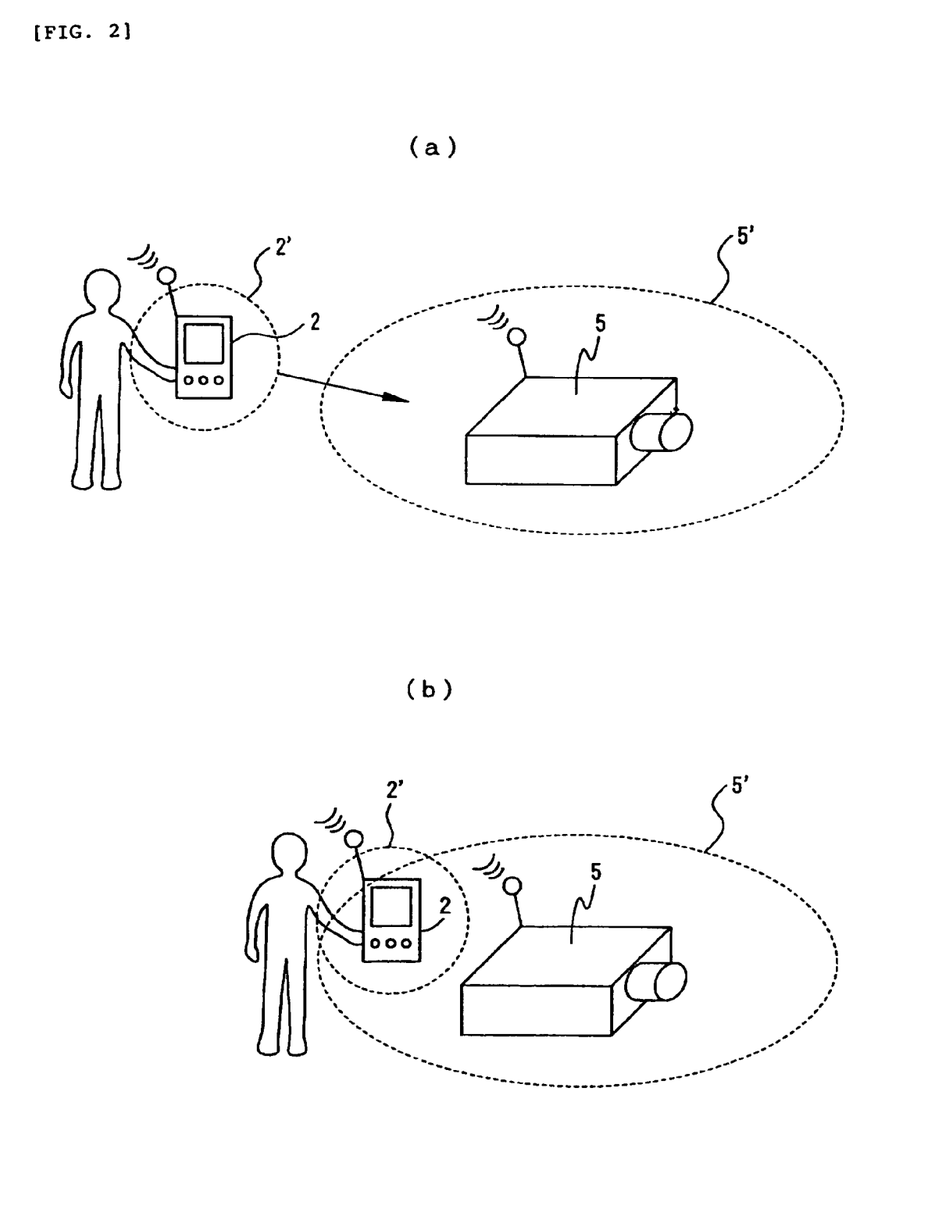
FIG. 2(a) is a schematic showing that a system user carrying an instruction apparatus 2 moves into the coverage of a first virtual object matched with a projector 5.
FIG. 2(b) is a schematic showing a state where as a result of the movement, a second virtual object 2' matched with the instruction apparatus 2 overlaps with the first virtual object 5' matched with the projector 5.

An exemplary configuration of the service providing system according to the present invention is first explained with reference to FIG. 1. FIG. 1 is a schematic showing the service providing system according to the present invention.

The service providing system 1 includes an instruction apparatus 2 to give operating instructions to a projector 5 serving as a service providing apparatus to be described below, a virtual object management apparatus 3 to control operations related to virtual objects, such as the setting of the virtual objects, a use authority management unit 4 to manage determination of the presence of use authority which is required by a system user in order to utilize the service, such as issuing the instructions to the projector 5 using the instruction apparatus 2, the projector 5 displaying an image on a display unit in response to the contents of the instructions issued from the user, and a network 6 to perform data communication among the respective apparatuses.

In the exemplary embodiment of the present invention, the instruction apparatus 2 is a portable instrument such as a PDA, a notebook PC, a mobile phone, etc. Although it has not been shown herein, the instruction apparatus 2 has a position information acquisition function to acquire its own position information, such the function of a GPS.

The virtual object management apparatus 3 includes a virtual object setting unit 3a to perform a virtual object setting or deleting operation of matching the virtual objects with the instruction apparatus 2 and the projector 5, or deleting the matched virtual objects, or the like; a position information management unit 3b to acquire and manage the position information on the instruction apparatus 2 matched with the virtual object; and a positional relationship calculation unit 3c to calculate the positional relationship between the virtual object matched with the instruction apparatus 2 and the virtual object matched with the projector 5 from the acquired position information.

Further, the use authority management unit 4 acquires the positional relationship between both the virtual objects matched with the instruction apparatus 2 and the projector 5, which has been calculated from the positional relationship calculation unit 3c of the virtual object management apparatus 3, and determines whether the system user has use authority to utilize the services based on the positional relationship.

Furthermore, in the exemplary embodiment, the projector 5 is a liquid crystal projector to cause an image displayed on a small liquid crystal panel to be displayed on a large screen by projecting the image magnified with a lens. Thus, it is possible to display electronic data, such as images or characters edited by a PC, directly on a display unit, such as a large screen.

Hereinafter, operation of the service providing system is specifically explained with reference to FIGS. 2(a) and 2(b). FIG. 2(a) is a schematic showing that the system user carrying the instruction apparatus 2 moves into the coverage of a first virtual object matched with the projector 5, and FIG. 2(b) is a schematic showing a state where, as a result of the movement, a second virtual object 2' matched with the instruction apparatus 2 overlaps with the first virtual object 5' matched with the projector 5.

As shown in FIG. 2(a), the projector 5 is matched with the first virtual object 5' by the virtual object management apparatus 3. Similarly, the instruction apparatus 2 is matched with the second virtual object 2'.

All the virtual objects have their own specific coverage. In the exemplary embodiment, it will be considered that the first virtual object 5' should not be shifted since the projector 5 cannot be moved. Accordingly, the instruction apparatus 2 matched with the second virtual object 2' is shifted by the user and approaches the projector 5, as shown in FIGS. 2(a) and 2(b).

Further, the position information acquired based on the position information acquisition function of the instruction apparatus 2 is transmitted to the position information management unit 3b via wireless communication, and then the positional relationship calculation unit 3c calculates the positional relationship between the first and second virtual objects 5', 2' based on the transmitted position information and previously stored information on the position and coverage of the virtual object 5'.

Furthermore, the use authority management unit 4 determines that the user has the use authority to utilize the service of the system when the positional relationship in which the coverage of the virtual object 5' partially overlaps with the coverage of the virtual object 2' is obtained from the calculated results as shown in FIG. 2(b). On the other hand, the use authority management unit 4 determines that the user does not have the use authority when the virtual object 5' does not overlap with the virtual object 2' in view of their coverage.

In the exemplary embodiment, the positional relationship in which the coverage of the virtual object 5' partially overlaps with the coverage of the virtual object 2', i.e., the virtual objects overlap with each other, as shown in FIG. 2(b), is referred to as an expression that the instruction apparatus has been in an area-in state.

Figure 3:
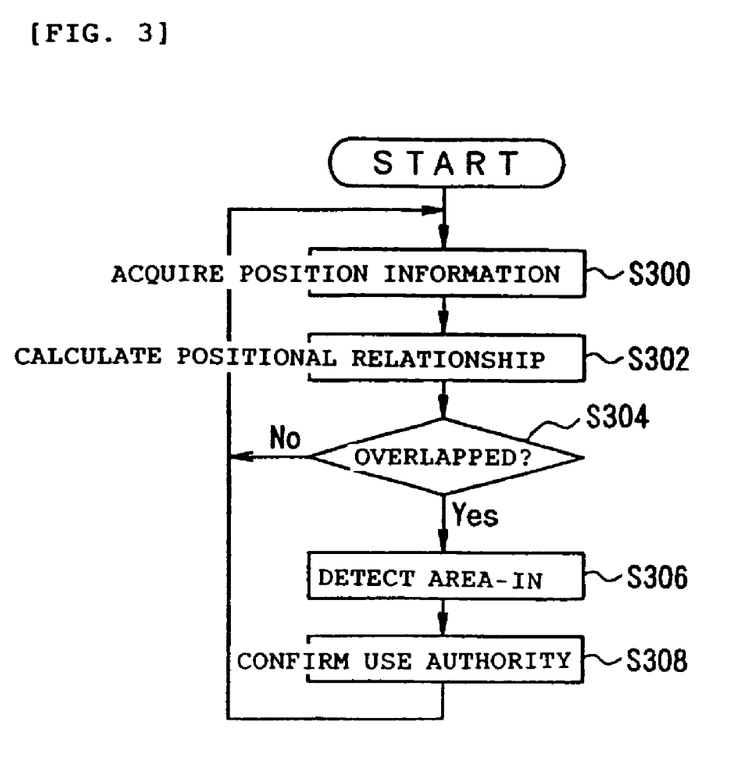

Hereinafter, a process of determining, by using the area-in, whether the user has the use authority will be explained with reference to FIG. 3. FIG. 3 is a flowchart illustrating the process of determining the use authority based on the area-in.

As shown in FIG. 3, it goes first into step S300 in which the position information management unit 3b acquires the position information from the instruction apparatus 2 and transmits the acquired position information to the positional relationship calculation unit 3c. Then, it goes into step S302.

After it goes into step S302, the positional relationship calculation unit 3c calculates the positional relationship between the second virtual object 2' matched with the instruction apparatus 2 and the first virtual object 5' matched with the projector 5 and transmits the calculated results to the use authority management unit 4. Then, it goes into step S304.

In step S304, it is determined from the calculated positional relationship whether the second virtual object 2' and the first virtual object 5' overlap with each other in view of their coverage. If it is determined that the coverage overlaps (Yes), it goes into step S306. Otherwise (No), it goes into step S300.

If it goes into step 306, the area-in state is detected because the virtual objects overlap with each other. Then, it goes into step S308.

In step S308, it is confirmed that the user has the use authority because the area-in state has been detected. Then, it goes into step S300. In the exemplary embodiment, if the use authority has been confirmed, an ID unique to the instruction apparatus that the user currently carries is transmitted to and registered in the use authority management unit 4. On the other hand, if the user carrying the instruction apparatus 2 goes out from the coverage of the first virtual object 5' and thus the virtual object 2' does not overlap with virtual object 5', it is determined that the user does not have the use authority. Thus, the registered unique ID is erased.

Figure 10:
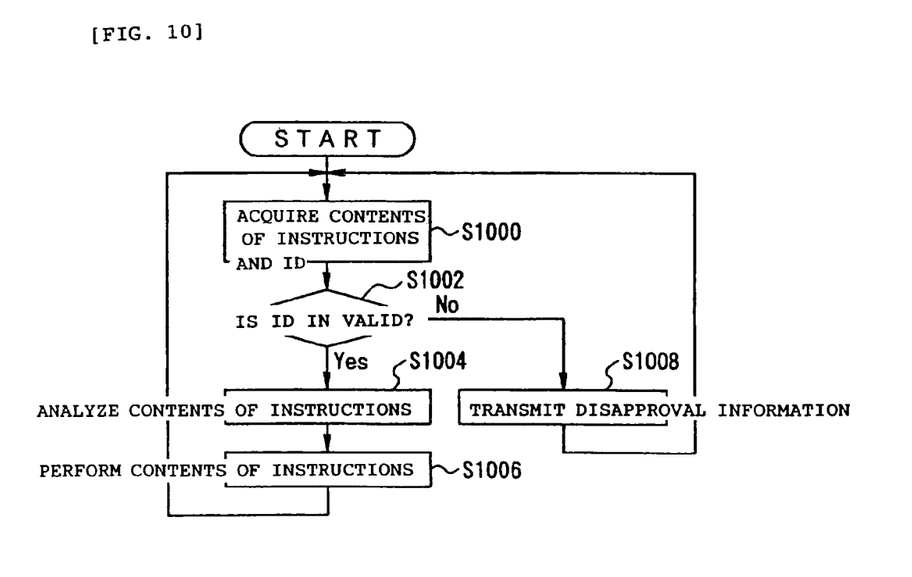
FIG. 10 is a flowchart illustrating a process of operating the projector 5.

In addition, a process of operating the projector 5 is explained with reference to FIG. 10. FIG. 10 is a flowchart illustrating the process of operating the projector 5.

As shown in FIG. 10, it first goes into step S1000 in which the contents of the instructions are acquired from the instruction apparatus 2. Then, it goes into step S1000. Here, it is deemed that the contents of the instructions include the unique ID.

If it goes into step 1002, based on the acquired unique ID, it is determined whether the matched instruction apparatus 2 has a valid unique ID. If it is determined that the instruction apparatus has the valid unique ID (Yes), it goes into step S1004. Otherwise (No), it goes into step S1008.

In a case where it goes into step S1004, the acquired contents of the instructions are analyzed, and then it goes into step S1006.

If it goes into step S1006, the projector 5 is caused to operate in response to the analyzed contents of the instructions. Then, it goes into step S1000.

On the other hand, in a case where it goes into step S1008 without having any valid unique ID, it is considered that the instructions cannot be received. Thus, disapproval information is transmitted to the instruction apparatus 2, and then, it goes into step S1000.

Accordingly, the contents of the instructions, which are transmitted from the instruction apparatus 2 having the valid unique ID by the user having the use authority, can be executed. However, the contents of the instructions, which are transmitted from the instruction apparatus 2 having no valid unique ID by the user having no use authority, cannot be executed.

In addition, an actual operation of the service providing system 1 is explained below. The instruction apparatus 2 is regarded as a PDA having a wireless communication function. Further, the virtual object setting unit 3a of the virtual object management apparatus 3 causes the second virtual object 2' to be matched with the PDA serving as the instruction apparatus 2. Moreover, the virtual object setting unit 3a causes the first virtual object 5' to be matched with the projector 5 to provide the service. As described above, the position of the first virtual object 5' is fixed, and thus it is deemed that the position information thereon is not changed.

These virtual objects have their own specific coverage, and position information on and coverage of them are managed by the position information management unit 3b. Herein, the first virtual object 5' matched with the projector 5 is a circle with a radius of 5.0 m. A vertical coverage thereof depends on the capacity of an transceiver (not shown in the figure), but it is at least a coverage in which it can be detected that the user carrying the instruction apparatus 2 moved into the coverage of the first virtual object 5'. Further, it is deemed that the second virtual object 2' matched with the instruction apparatus 2 is a sphere with a radius of 0.5 m.

Furthermore, the service providing system 1 provides a service to display the image on the screen in response to the contents of the user's instructions. Here, it is also deemed that the system user utilizes this service when performing a presentation for new products and business.

Based on the above conditions, the actual operation of the service providing system is hereinafter explained. First, if the presenter who performs the presentation approaches the first virtual object 5' while carrying the instruction apparatus 2, the position information on the PDA can be acquired by the position information acquisition function of the PDA. Then, the acquired information is transmitted to the position information management unit 3b of the virtual object management apparatus 3 by wireless communication. The position information management unit 3b is configured to acquire the position information on the portable instruction apparatus 2 in real time (step S300).

The acquired position information is transmitted to the positional relationship calculation unit 3c in which the positional relationship between the first and second virtual objects 5' and 2' is in turn calculated (step S302). In the exemplary embodiment, since a central position of the PDA is deemed to be acquired as a position information and the position information management unit 3*b* includes the information on the coverage of the second virtual object 2' matched with the instruction apparatus 2, the positional relationship is calculated based on the information on the coverage of the second virtual object 2', the position information on the fixed first virtual object 5' (which is a reference position), and the coverage of the first virtual object 5'.

If the position information is calculated, it can be known whether the first and second virtual objects 5', 2' overlap with each other in view of their coverage. Herein, it is deemed that they overlap with each other (step S304). Thus, the position information is transmitted to the use authority management unit 4 in which it is in turn determined and confirmed that the system user has the use authority (step S308).

If the use authority is confirmed, the instruction apparatus 2 executes instruction software and transmits the contents of the instructions to the projector 5 through manipulation by a hand of the presenter. At this time, in addition to the contents of the instructions, the unique ID has to be certainly transmitted each time.

If the projector 5 receives the contents of the instructions (step S1000), it is determined whether the unique ID included in the contents of the instructions is valid (step S1002). Herein, it is deemed that the ID is valid. Since the projector 5 receives the contents of the instructions from the instruction apparatus 2 having the valid unique ID, the received contents of the instructions are analyzed (step S1004) and the operation of the projector 5 is then performed on the basis of the analyzed contents of the instructions (step S1006).

Further, a plurality of the first virtual objects 5' may be placed at other locations as well as around the projector 5.

As described above, according to the first exemplary embodiment of the present invention, the use authority management unit 4 is configured to determine that the user has the use authority, when the user carries the instruction apparatus 2 matched with the second virtual object 2' and approaches the projector 5 matched with the first virtual object 5' so that the second and first virtual objects 2', 5' overlap with each other. Thus, the determination can be made without any troublesome work such as the input of an ID or password, and use of the projector 5 can be limited only to the presenter who utilizes the projector for the purpose of the presentation.

Figure 4:
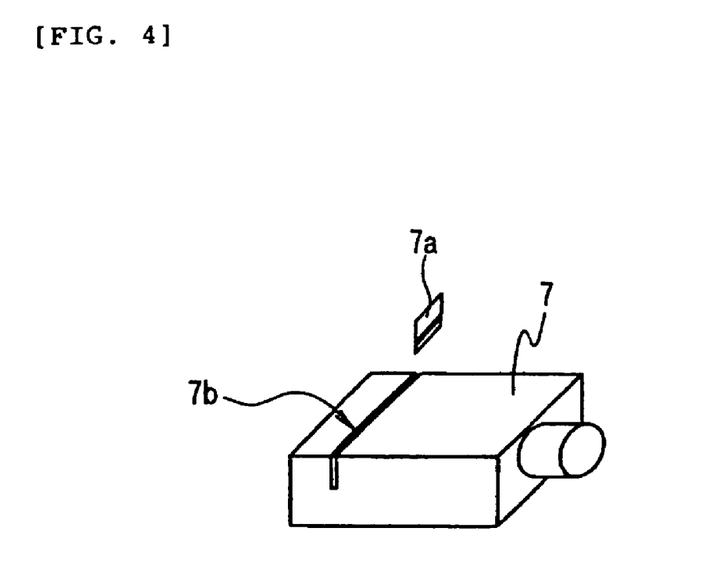
FIG. 4 is a schematic showing a projector mounted with a card reader for reading use authority information recorded on an authentication card.
Figure 6:
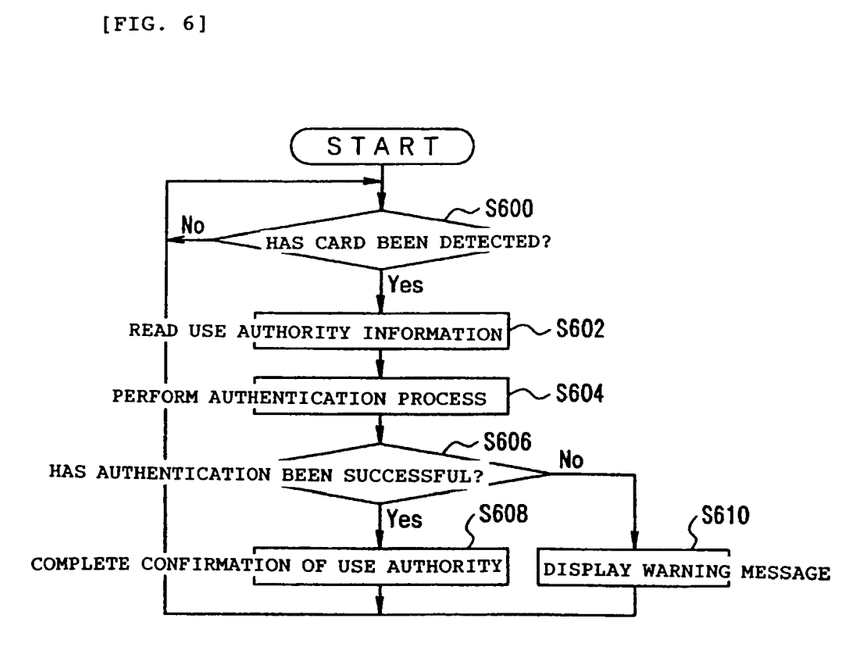
FIG. 6 is a flowchart illustrating a process of determining the presence of the use authority by device of the card reader.

In addition, a second exemplary embodiment of the present invention where an authentication card is used to determine whether the user has the use authority is explained with reference to FIGS. 4 and 6. FIG. 4 is a schematic showing a projector mounted with a card reader to read use authority information recorded on the authentication card, and FIG. 6 is a flowchart illustrating a process of determining the presence of the use authority by use of the card reader. In view of the configuration thereof, the virtual object management apparatus 3 and the use authority management unit 4 are eliminated from the system shown in FIG. 1, and the projector 7 mounted with the card reader is provided instead of the projector 5.

The projector 7 mounted with the reader is constructed in such a manner that a card reader 7*b* to read the use authority information recorded on the authentication card 7*a* and a use authority determination unit, not shown, to determine whether the user has the use authority on the basis of the read use authority information are added to the projector 5. That is, it is constructed such that the magnetically recorded use authority information is read by causing the authentication card 7*a* to pass through a slit in the card reader 7*b*, and the use authority determination unit determines the presence of the use authority on the basis of the read use authority information.

Hereinafter, a process of determining the presence of the use authority by use of the projector mounted with the reader 7 is explained with reference to FIG. 6.

As shown in FIG. 6, it first goes into step S600 in which it is determined whether the card reader 7*b* has detected the authentication card. If it is determined that the card reader has detected the card (Yes), it goes into step S602. Otherwise (No), it is in a stand-by state until the card reader detects the card.

In step S602, the use authority information is read from the authentication card, which is passed through the slit in the card reader 7*b*. Then, it goes into step S604.

In step S604, the use authority determination unit performs an authentication process of determining whether the read use authority information is valid. Then, it goes into step S606. In step S606, it is determined whether the use authority information is correct, based on authentication process results. If it is determined that the information is correct (Yes), it goes into step S608. Otherwise (No), it goes into step S610.

If it goes into step S608, it is determined that the use authority information is correct, and thus it is confirmed that the user has the use authority. Then, it goes again into step S600.

On the other hand, if it goes into step S610 because the use authority information is not correct, a warning message or the like is displayed on a display unit of the instruction apparatus 2. Then, it goes again into step S600.

As described above, according to the second exemplary embodiment of the present invention, it is determined whether the user has the use authority, by causing the card reader 7*b* to read the use authority information recorded on the authentication card 7*a* and then determining whether the use authority information is correct. Therefore, the use of the projector 7 mounted with the reader by any other persons other than a user who carries the authentication card with the correct use authority information recorded thereon can be prevented.

Figure 5:
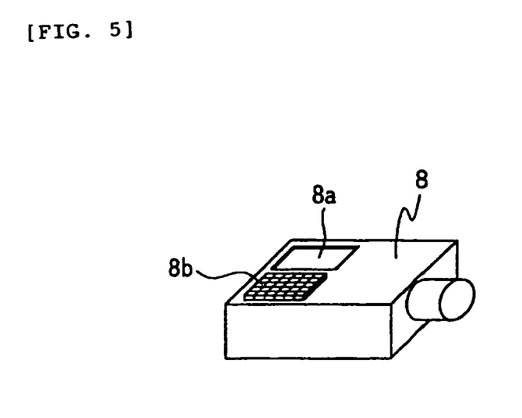
FIG. 5 is a schematic showing a projector mounted with an input device to input characters.
Figure 7:
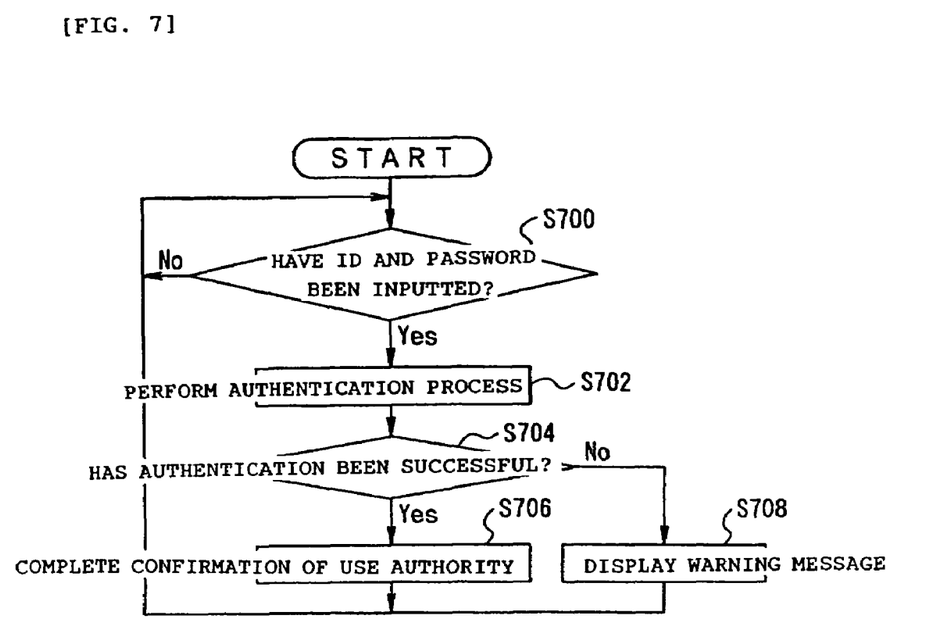
FIG. 7 is a flowchart illustrating a process of determining the presence of authority to give instructions by device of input of an ID and password.

In addition, a third exemplary embodiment of the present invention where an ID and password inputted through an input device are used to determine the presence of the use authority is explained with reference to FIGS. 5 and 7. FIG. 5 is a schematic showing a projector mounted with the input device to input characters, and FIG. 7 is a flowchart illustrating a process of determining the presence of authority to give instructions by use of input of an ID and password. Further, in view of the constitution thereof, the virtual object management apparatus 3 and the use authority management unit 4 are eliminated from the system shown in FIG. 1, and the projector 7 mounted with the input device is provided instead of the projector 5.

The projector 7 mounted with the input device is constructed in such a manner that the input device 8*b* to input characters, a character display unit 8*a* to display the inputted characters, and a use authority determination unit, not shown, to determine whether the user has the use authority on the basis of the inputted ID and password are added to the projector 5. That is, it is constructed such that the ID and password are inputted through the input device ,and the use authority determination unit is caused to determine the presence of the use authority on the basis of the inputted ID and password.

Hereinafter, a process of determining the presence of the use authority by use of the projector mounted with the input device 8 is explained with reference to FIG. 7.

As shown in FIG. 7, it first goes into step S700 in which it is determined whether an ID and password have been inputted. If it is determined that the ID and password have been inputted (Yes), it goes into step S702. Otherwise (No), it is in a stand-by state until the ID and password are inputted.

In step S702, an authentication process of determining whether the read ID and password are valid is performed. Then, it goes into step S704.

In step S704, it is determined whether the ID and password are correct on the basis of authentication process results. If the ID and password are correct (Yes), it goes into step S706. Otherwise (No), it goes into step S708.

If it goes into step S706, it is determined that the ID and password are correct, and thus it is confirmed that the user has the use authority. Then, it goes again into step S700.

On the other hand, if it goes into step S708 because the ID and password are not correct, a sentence or the like requiring the user to input a correct ID and password again is displayed on the display unit 8a. Then, it goes again into step S700.

As described above, according to the third exemplary embodiment of the present invention, the presence of the use authority is determined by inputting the ID and password through the input device 8b and then causing the use authority determination unit to determine whether the inputted ID and password are correct. Therefore, the use of the projector 8 mounted with the reader by any other persons other than a user who knows the correct ID and password can be prevented.

Figure 8:
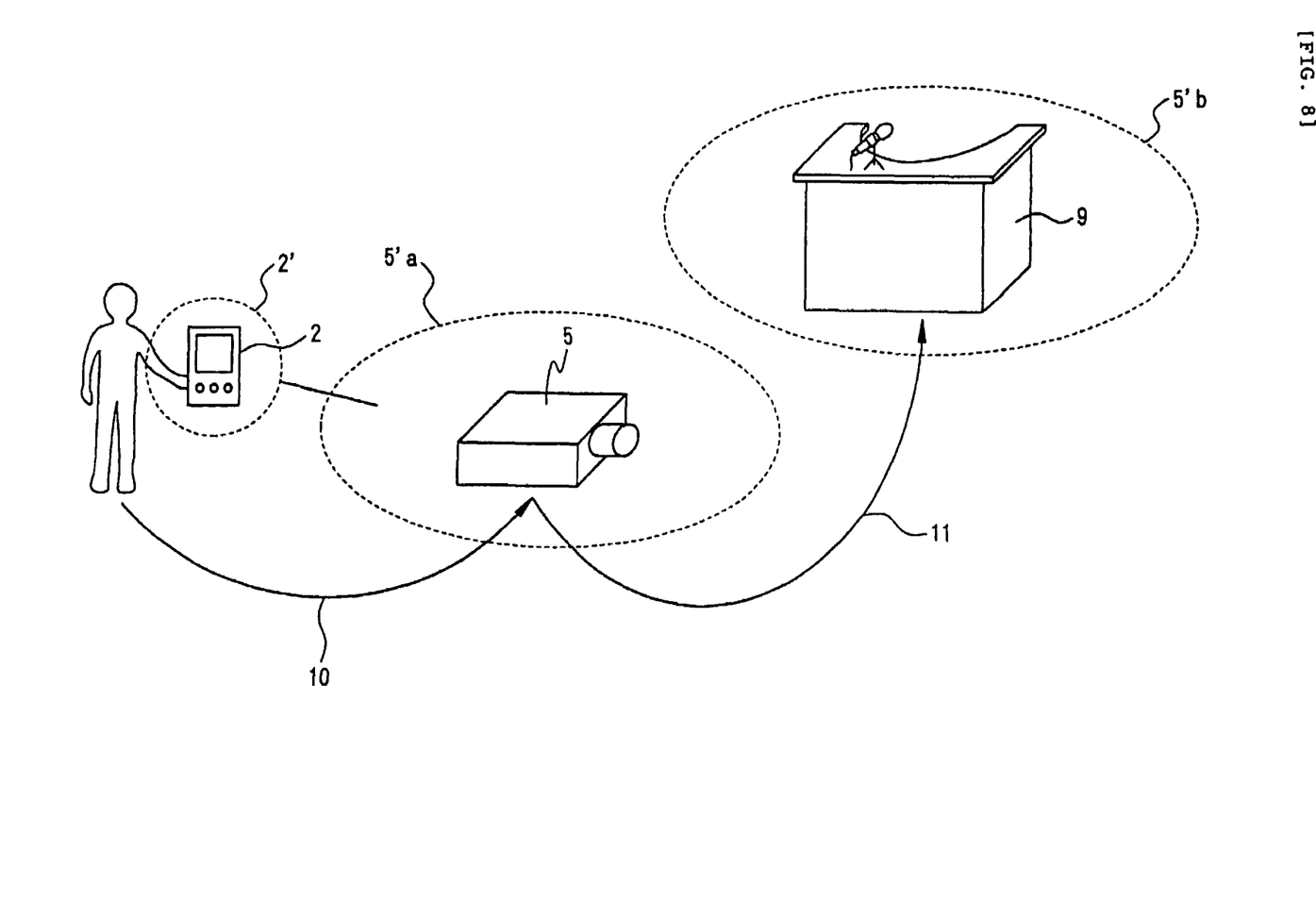
FIG. 8 is a schematic showing an example of a moving path of the user carrying the instruction apparatus 2 in a case where a first virtual object 5'a is placed around the projector 5 and another first virtual object 5'b is placed around a rostrum 9.
Figure 9:
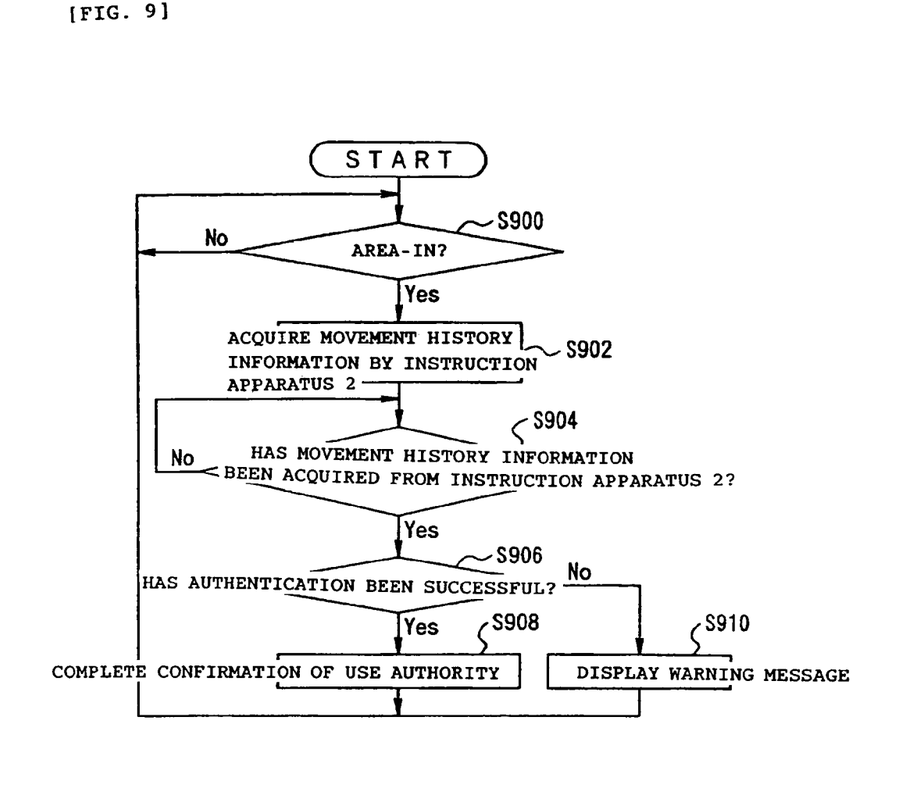
FIG. 9 is a flowchart illustrating a process of determining the presence of the use authority by use of a history of movement into a plurality of areas.

Furthermore, as a fourth exemplary embodiment of the present invention, an example of determining the presence of the use authority when a plurality of the first virtual objects are matched with the projector 5 is explained with reference to FIGS. 8 and 9. FIG. 8 is a schematic showing an example of a moving path of a user carrying the instruction apparatus 2 in a case where a first virtual object 5'a is placed around the projector 5 and another virtual object 5'b is placed around a rostrum 9. FIG. 9 is a flowchart illustrating a process of determining the presence of the use authority by use of a history of movement into a plurality of areas.

Further, in view of the configuration thereof, it is constructed in such a manner that a movement history storage unit to store the history of movement into the areas is added to the configuration of FIG. 1.

As shown in FIG. 8, the virtual object setting unit 3a causes the first virtual objects 5'a, 5'b to be placed within the coverage in which the projector 5 and the rostrum 9 are included, respectively. Further, when a system user who is carrying the second virtual object moves along the moving path in the order of arrows 10, 11 shown in the figure, the movement history storage unit stores such a movement history. That is, information on the contacts of the second virtual object 2' matched with the instruction apparatus 2 with the first virtual objects 5'a, 5'b and a contact sequence thereof is stored. Further, the use authority management unit 4 reads the movement history from the movement history storage unit when the user just arrives at the rostrum 9, and determines the presence of the use authority on the basis of determines the presence of the use authority according to whether the movement sequence corresponds to the previously set moving path.

Hereinafter, a process of determining the presence of the use authority by use of the history of the movement into the plurality of areas is explained with reference to FIG. 9.

As shown in FIG. 9, it first goes into step S900 in which it is determined whether the instruction apparatus 2 is in the area-in state. If it is determined that the instruction apparatus has been in the area-in state (Yes), it goes into step S902. Otherwise (No), it is in a stand-by state until the instruction apparatus is in the area-in state.

In step S902, the instruction apparatus 2 acquires the movement history information from the movement history storage unit and transmits the acquired information to the use authority management unit 4. Then, it goes into step S904.

In step S904, it is determined whether the movement history information has been acquired by the area-in of the instruction apparatus 2. If so (Yes), it goes into step S906. Otherwise (No), it is in a standby state until the information is acquired.

In step S906, it is determined whether the acquired movement history has been authenticated as being the same order as the set movement sequence. If it is determined as having been authenticated as such (Yes), it goes into step S908. Otherwise (No), it goes into step S910.

In step S908, it is confirmed that the user has the use authority. Then, it goes again into step 900.

On the other hand, if it goes into step S910 because the authentication failed, a warning message indicating that the authentication failed is displayed on the instruction apparatus 2. Then, it goes again into step S900.

As described above, according to the fourth exemplary embodiment of the present invention, the movement history for indicating a predetermined movement sequence along which the user carrying the instruction apparatus 2 matched with the second virtual object moves through the coverage of the plurality of the first virtual objects is stored. Thus, it is determined whether the user has the use authority, by determining whether the movement history corresponds to the previously set moving path. Accordingly, the use of the projector 5 by a person who does not know the correct moving path can be prevented without any troublesome work, such as the input of an ID, password or the like. The use of the projector by the user can be regulated.

Figure 11:
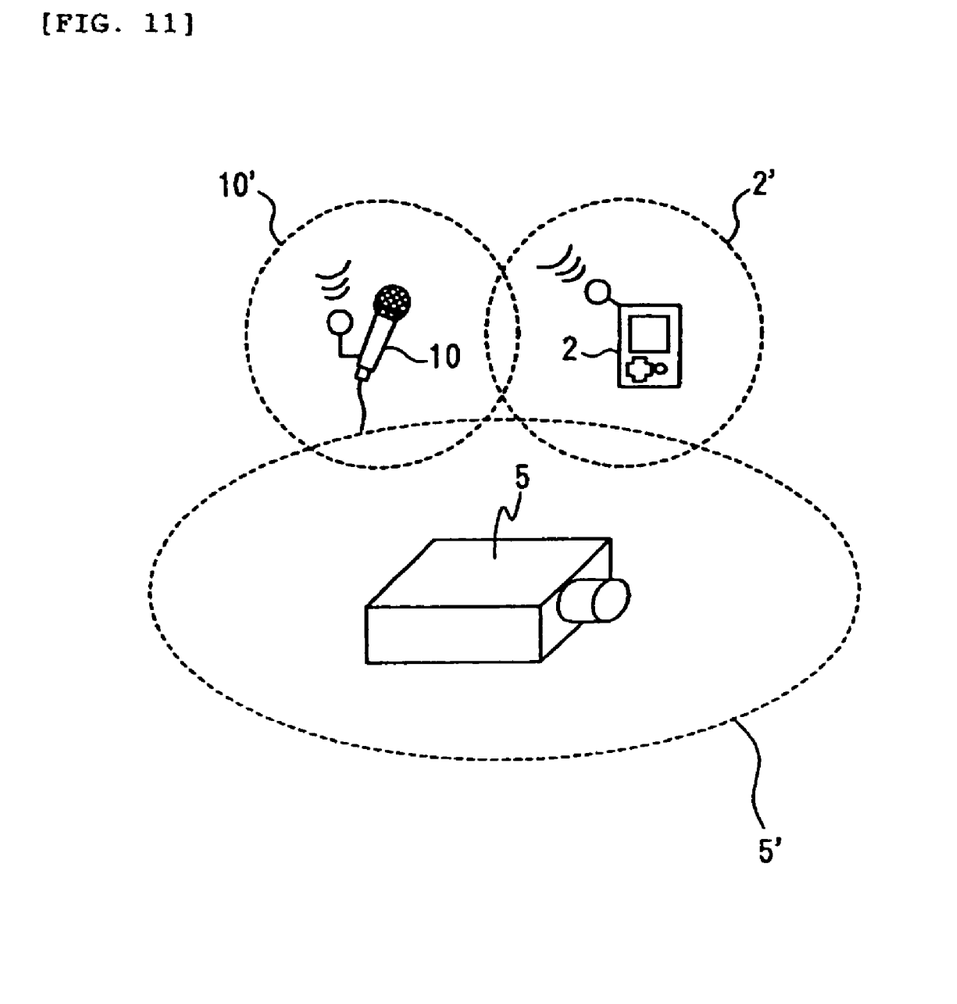
FIG. 11 is a schematic showing an example in which a third virtual object 10' matched with a microphone 10, the second virtual object 2' matched with the instruction apparatus 2, and the first virtual object 5' placed at the position of the projector 5 overlap with one another.

In addition, as a fifth exemplary embodiment of the present invention, a process of determining the presence of the use authority in a case where the virtual object setting unit 3a causes a third virtual object 10' to be matched with a microphone 10 is explained with reference to FIG. 11. FIG. 11 is a view showing an example in which the third virtual object 10' matched with the microphone 10, the second virtual object 2' matched with the instruction apparatus 2, and the first virtual object 5' placed at the position of the projector 5 overlap with one another.

In view of the configuration thereof, the microphone 10 is added to the configuration shown in FIG. 1. In such a case, the microphone 10 has a positional relationship acquisition function for acquiring its own position information and a wireless communication function to transmit and receive the relevant data.

Assume that the system is used in the presentation of a new business or new products. Then, the user moves into the coverage of the first virtual object 5' matched with the projector 5 as shown in FIG. 11 while carrying the instruction apparatus 2 matched with the second virtual object 2'. Assuming that the microphone 10 is placed within the coverage, the use authority management unit 4 determines that the user has the use authority when the third virtual object 10' matched with the microphone 10, the second virtual object 2', and the first virtual object 5' placed around the projector 5 overlap with one another.

As described above, according to the fifth exemplary embodiment of the present invention, it can be determined that the user has the use authority, by determining whether the third virtual object 10' matched with the microphone 10, the second virtual object 2' matched with the instruction apparatus 2, and the first virtual object 5' placed around the projector 5 overlap with one another. Therefore, it can be determined that the user carrying both the microphone 10 and the instruction apparatus 2 has the use authority.

Furthermore, as a sixth exemplary embodiment of the present invention, a service providing system to determine the presence of the use authority on the basis of attribute information on the data to be projected by the projector 5 is explained below. It is constructed in such a manner that the virtual object management apparatus 3 is removed from the configuration of the system shown in FIG. 1.

That is, an author's name of data, a sender of data, memory addresses of data, authentication information, a size of data, the number of displayed pieces of data, a file format of data, and the like are set as the attribute information on the data to be projected by the projector 5. Further, a predetermined condition is provided to the attribute information. Thus, if the data to be projected by the projector has attribute information satisfying the predetermined condition, it is determined that the user who manages the data has the use authority. Accordingly, based on the attribute information on the data to be projected, it is determined whether the user has the use authority.

As described above, according to the sixth exemplary embodiment of the present invention, since the presence of the use authority is determined on the basis of the attribute information on the data to be projected, the use of the projector 5 can be restricted, i.e., projection of improper data can be reduced or prevented.

Herein, the virtual object management apparatus 3 shown in FIG. 1 corresponds to a virtual object management terminal set forth in the fourth aspect; the virtual object setting unit 3a corresponds to a virtual object setting device set forth in the fourth and eighth aspects; the positional relationship calculation unit 3c corresponds to a positional relationship calculation device set forth in the fourth aspect; the projector 5 corresponds to a service providing apparatus set forth in the first to sixth aspects and a projection-type display apparatus set forth in the seventh and ninth aspects; the use authority management unit 4 corresponds to a use authority determination device set forth in the first to sixth, eighth and ninth aspects; the projector 7 mounted with the reader shown in FIG. 2(a) corresponds to a projection-type display apparatus set forth in the eleventh aspect; and the projector 8 mounted with the input device corresponds to a projection-type display apparatus set forth in the tenth aspect.

Further, in the exemplary embodiment of the present invention, if the system user carrying the instruction apparatus 2 merely approaches the virtual object to be in the area-in state, it is determined that the user has the use authority, and thus the user can utilize the relevant service. However, an available period of time for the service from after the user is in the area-in state may be set. For example, assume a case where a time limit of the presentation assigned to each presenter is intended to be set when the service is used for the presentation of the new products, etc. In such a case, if the available period of time for the service is merely set, it becomes the time limit of the presentation for one presenter. Thus, there is convenience in that additional measurement of time limits is not needed.

[Advantages]

As described above, according to the service providing system of the first aspect of the present invention, since it is determined whether the user has the use authority, a person having no use authority cannot be allowed to utilize the service. Thus, users can be qualified and it is also possible to limit use of the service by an unqualified and unreliable person, thereby assisting in reducing or preventing the occurrence of trouble, and the like.

Further, according to the service providing apparatus of the second aspect of the present invention, the use authority information is inputted through the use authority information unit and the use authority determination device determines whether the user has the use authority based on the inputted use authority information. Thus, in addition to the effects of the first aspect of the present invention, users can be qualified and it is also possible to limit use of the service by an unqualified and unreliable person, thereby assisting in reducing or preventing the occurrence of trouble, and the like.

Furthermore, according to the service providing apparatus of the third aspect of the present invention, since the use authority information is read by the use authority reading device from the authentication card on which the use authority information is recorded, and the use authority determination device determines whether the user has the use authority based on the read use authority information, the user can utilize the service if it is determined that the user has the use authority. Thus, in addition to the effects of the first aspect, there is convenience in that troublesome work, such as the input of characters is not needed.

Moreover, according to the service providing apparatus of the fourth aspect of the present invention, since the system user having the instruction apparatus matched with the virtual object is determined as having the use authority by use of the area-in of the system user and then can utilize the service, users can be qualified and it is also possible to limit use of the service by an unqualified and unreliable person, thereby assisting in reducing or preventing the occurrence of trouble, and the like. In addition, there is convenience in that the user can easily utilize the service by use of the area-in into a specific area.

Further, according to the service providing apparatus of the fifth aspect of the present invention, the plurality of first virtual objects are matched with the service providing apparatus, and then placed in the virtual space matched with the actual space. If any one of the plurality of first virtual objects, and the first virtual object matched with the instruction apparatus exist in the identical position in the overlapped state, the use authority determination device determines that the user has the use authority. Accordingly, the user can utilize the service. Thus, in addition to the effects of the fourth aspect, by studying the arrangement positions of the first virtual objects, there is convenience in that the user can easily utilize the service.

Furthermore, according to the service providing apparatus of the sixth aspect of the present invention, when the second virtual object comes into contact with the first virtual objects, the overlap history storage device stores their contact history and then the use authority determination device determines whether the user has the use authority from the overlapped sequence or the like based on the stored history. If the user has the use authority, the user is allowed to utilize the service. Thus, in addition to the effects of the fourth aspect, this assists in reducing or preventing use of the service by an unqualified person such as an outsider or audience member.

Moreover, according to the service providing apparatus of the seventh aspect of the present invention, in the service providing system of any one of the first to sixth aspects of the present invention, the service providing apparatus is the projection-type display apparatus and the specific service is to give the instructions to the projection-type display apparatus through the instruction apparatus and to cause the image to be displayed on the display unit, such as the screen, by operating the projection-type display apparatus in response to the contents of the instructions from the instruction apparatus.

Further, according to the service providing apparatus of the eighth aspect of the present invention, the third virtual object is caused to be matched with the predetermined device other than the service providing apparatus by the virtual object setting device, and the use authority determination device is configured to determine that the user has the use authority when all of the second and third virtual objects and the first virtual object overlap with one another, so that the user can utilize the service. Thus, it can be expected to further improve the convenience of the service by devising the setting of the third virtual object.

Furthermore, according to the service providing apparatus of the ninth aspect of the present invention, the use authority determination device is configured to determine whether the system user has the use authority to cause the data to be projected by the projection-type display apparatus based on the attribute information on the data projected by the projection-type display apparatus. Thus, in addition to the effects of the seventh or eighth aspects, the presence of the use authority required for projecting the data is determined based on the setting conditions and the like, thereby assisting in preventing the projection of improper data, and the like.

Moreover, since the service providing apparatus of the tenth aspect of the present invention is constructed by adding the use authority information input unit to input the use authority information and the use authority determination unit to determine whether the system user has the use authority to the service providing apparatus of the third aspect of the present invention, its effects are identical with those of the third aspect.

Further, since the service providing apparatus of the eleventh aspect of the present invention is constructed by adding the use authority information reading unit to read the use authority information from the authentication card, and the use authority determination device to determine whether the system user has the use authority, to the service providing apparatus of the fourth aspect, its effects are identical with those of the fourth aspect.

What is claimed is:

1. A service providing apparatus to provide a specific service in a service providing system that provides the specific service in response to the contents of instructions issued from a system user having use authority, comprising:
   a use authority information input unit to input use authority information regarding the use authority of the system user; and
   a service providing system, the service providing system comprising:
      an instruction apparatus to give the instructions to the service providing apparatus;
      a use authority determination device to determine whether the system user has the use authority; and
      a virtual object management terminal to manage a virtual object, the virtual object management terminal including:
         a virtual object setting device which causes the service providing apparatus to be matched with a first virtual object and the instruction apparatus to be matched with a second virtual object and a predetermined device other than the service providing apparatus to be matched with a third virtual object, and places the first virtual object in a virtual space matched with an actual space and the second virtual object at or around the position of the instruction apparatus in the virtual space and the third virtual object at or around the position of the predetermined device in the virtual space,
         a position information acquisition device to acquire position information used to specify the position of the instruction apparatus, and
         a positional relationship calculation device to calculate the positional relationship between the first and second and third virtual objects based on the acquired position information, and
      the use authority determination device being configured to determine that the system user has the use authority if the calculated positional relationship is a relationship in which the second and third virtual objects and the first virtual object exist in an identical position in an overlapped state.

2. A service providing apparatus to provide a specific service in a service providing system that provides the specific service in response to the contents of instructions issued from a system user having use authority, comprising:
   a use authority information reading unit to read use authority information from an authentication card on which the use authority information is recorded; and
   a service providing system, the service providing system comprising:
      an instruction apparatus to give the instructions to the service providing apparatus;
      a use authority determination device to determine whether the system user has the use authority; and
      a virtual object management terminal to manage a virtual object, the virtual object management terminal including:
         a virtual object setting device which causes the service providing apparatus to be matched with a first virtual object and the instruction apparatus to be matched with a second virtual object and a predetermined device other than the service providing apparatus to be matched with a third virtual object, and places the first virtual object in a virtual space matched with an actual space and the second virtual object at or around the position of the instruction apparatus in the virtual space and the third virtual object at or around the position of the predetermined device in the virtual space,
         a position information acquisition device to acquire position information used to specify the position of the instruction apparatus, and
         a positional relationship calculation device to calculate the positional relationship between the first and second and third virtual objects based on the acquired position information, and
      the use authority determination device being configured to determine that the system user has the use authority if the calculated positional relationship is a relationship in which the second and third virtual objects and the first virtual object exist in an identical position in an overlapped state.

* * * * *